United States Patent
Lv

(10) Patent No.: US 8,605,706 B2
(45) Date of Patent: Dec. 10, 2013

(54) METHOD AND EQUIPMENT FOR NOTIFYING PURPOSE OF SUBFRAME, METHOD AND EQUIPMENT FOR PROCESSING SUBFRAME

(75) Inventor: Yongxia Lv, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 170 days.

(21) Appl. No.: 13/278,829

(22) Filed: Oct. 21, 2011

(65) Prior Publication Data
US 2012/0039236 A1    Feb. 16, 2012

Related U.S. Application Data

(63) Continuation of application No. PCT/CN2009/071418, filed on Apr. 23, 2009.

(51) Int. Cl.
*H04J 3/00*    (2006.01)

(52) U.S. Cl.
USPC .......................................... 370/345; 370/329

(58) Field of Classification Search
USPC .......................................... 370/345, 312, 329
See application file for complete search history.

(56) References Cited

U.S. PATENT DOCUMENTS

| | | | |
|---|---|---|---|
| 7,940,740 B2 * | 5/2011 | Krishnamurthy et al. .... | 370/344 |
| 2008/0261573 A1 | 10/2008 | Kuo | |
| 2010/0172311 A1 * | 7/2010 | Agrawal et al. ............... | 370/329 |

FOREIGN PATENT DOCUMENTS

| | | |
|---|---|---|
| CN | 101247625 A | 8/2008 |
| CN | 101262635 | 9/2008 |
| CN | 101321368 A | 12/2008 |
| CN | 101489184 A | 7/2009 |
| CN | 101583080 A | 11/2009 |
| ES | 2366417 T3 | 10/2011 |
| WO | WO 2008/024751 A2 | 2/2008 |
| WO | WO 2008/084634 A1 | 7/2008 |

OTHER PUBLICATIONS

Working Doc: IEEE Standard for Local and metropolitan area networks; Part 16: Air Interface for Fixed Broadband Wireless Access Systems Amendment for Improved Coexistence Mechanisms for License-Exempt Operation; dated May 31, 2006; IEEE P801.16h (156 pgs.).

802.16 IEEE Standard for Local and metropolitan area networks Part 16: Air Interface for Fixed Broadband Wireless Access Systems; IEEE Computer Society and the IEEE Microwave Theory and Techniques Society; Sponsored by the LAN/MAN Standards Committee; IEEE Std 802.16—2004(Revision of IEEE Std 802.16/2001); dated Oct. 1, 2004 (893 pgs.).

(Continued)

*Primary Examiner* — Albert T Chou
(74) *Attorney, Agent, or Firm* — Slater & Matsil, L.L.P.

(57) ABSTRACT

A method and an equipment for notifying a purpose of a subframe, and a method and an equipment for processing a subframe are disclosed. The method includes: sending a broadcast message to a user equipment (UE), where the broadcast message carries indication information indicating a purpose of a Multicast Broadcast Single Frequency Network (MBSFN) subframe; and sending a radio frame to the UE, wherein the radio frame carries the MBSFN subframe which serves the purpose indicated by the indication information. The technical solutions of the present invention enable the UE to be notified of the true purpose of the MBSFN subframe, and improve communication reliability.

14 Claims, 5 Drawing Sheets

(56) References Cited

OTHER PUBLICATIONS

Call for Contributions; IEEE 802.16's License-Exempt (LE) Task Group; IEEE 802.16h-05/014; dated Jun. 9, 2005 (1 pg.).
International Search Report related to International Patent Application No. PCT/CN2009/071418; filed Apr. 23, 2009; mailed Jan. 28, 2010 (4 pgs.).
Written Opinion of the International Searching Authority related to International Patent Application No. PCT/CN2009/071418; filed Apr. 23, 2009; mailed Jan. 28, 2010 (4 pgs.).
First Office Action of Chinese Application No. 200980119546.6 mailed Apr. 22, 2013, 9 pages. (Partial Translation).
Chinese Search Report received in Application No. 2009801195466 mailed Apr. 9, 2013, 2 pages.

* cited by examiner

METHOD AND EQUIPMENT FOR NOTIFYING PURPOSE OF SUBFRAME, METHOD AND EQUIPMENT FOR PROCESSING SUBFRAME

CROSS-REFERENCE TO RELATED APPLICATIONS

This application is a continuation of International Application No. PCT/CN2009/071418, filed on Apr. 23, 2009, which is hereby incorporated by reference in this entirety.

FIELD OF THE INVENTION

The present invention relates to the field of communication technologies, and in particular, to a method and an equipment for notifying a purpose of a subframe, and a method and an equipment for processing a subframe.

BACKGROUND OF THE INVENTION

The transmission modes between a base station and a user equipment (UE) generally include a unicast transmission mode and a multicast transmission mode. The unicast transmission mode refers to one-to-one data transmission between the base station and the UE. A Multicast Broadcast Single Frequency Network (MBSFN) transmission mode may be considered as one of the multicast transmission modes. The MBSFN transmission mode generally means that multiple cell base stations in a specific geographic area transmit the same signal on the same band. The UE processes signals transmitted by the multiple cell base stations in a multi-path signal processing mode, implements diversity receiving, and obtains a receive diversity gain.

The Long Term Evolution (LTE) protocol of the 3rd Generation Partnership Project (3GPP) stipulates that one radio frame may include not only multiple non-MBSFN subframes, but also one or more MBSFN subframes. A non-MBSFN subframe may be used for unicast transmission, and an MBSFN subframe may be used for MBSFN transmission.

For a UE, in the unicast transmission mode, a signal sent by a base station in a neighboring cell is an interference signal; in the MBSFN transmission mode, a signal of the neighboring cell is a multi-path signal rather than an interference signal.

The UE identifies which subframes are MBSFN subframes and which are non-MBSFN subframes among multiple subframes in a radio frame. By default, the UE regards the MBSFN subframe as being used for MBSFN transmission, and demodulates and processes data borne by the MBSFN subframe in the processing mode corresponding to the MBSFN subframe.

With continuous evolution of technologies, the purpose of the MBSFN subframe may not be limited to the MBSFN transmission, but may also be bearing data required for implementing other new technologies. Therefore, in the prior art, when an MBSFN subframe is used for bearing data required for implementing other new technologies, because the UE does not know the true purpose of the MBSFN subframe, the UE may be unable to demodulate or process the data borne by the MBSFN subframe correctly, which leads to failure of communication.

SUMMARY OF THE INVENTION

An embodiment of the present invention provides a method and an equipment for notifying the purpose of a subframe, and a method and an equipment for processing a subframe, which enable a UE to be notified of the true purpose of an MBSFN subframe and improve communication reliability.

To fulfill the foregoing objectives of the present invention, the technical solutions of the present invention are as follows:

A method for notifying a purpose of a subframe includes:

sending a broadcast message to a UE, where the broadcast message carries indication information indicating a purpose of an MBSFN subframe; and sending a radio frame to the UE, where the radio frame carries the MBSFN subframe which serves the purpose indicated by the indication information.

A method for processing a subframe includes:

receiving a broadcast message, where the broadcast message carries indication information indicating a purpose of an MBSFN subframe; resolving the broadcast message and determining the purpose of the MBSFN subframe; receiving a radio frame, where the radio frame includes the MBSFN subframe which serves the purpose indicated by the indication information; and demodulating and processing the received MBSFN subframe in a processing mode corresponding to the determined purpose of the MBSFN subframe.

An access network equipment includes:

a first sending module, configured to send a broadcast message to a UE, where the broadcast message carries indication information indicating a purpose of an MBSFN subframe; and a second sending module, configured to send a radio frame to the UE, where the radio frame carries the MBSFN subframe which serves the purpose indicated by the indication information.

A UE includes:

a first receiving module, configured to receive a broadcast message, where the broadcast message carries indication information indicating a purpose of an MBSFN subframe; a resolving and determining module, configured to resolve the broadcast message received by the first receiving module and determine the purpose of the MBSFN subframe; a second receiving module, configured to receive a radio frame that includes the MBSFN subframe which serves the purpose indicated by the indication information; and a demodulating and processing module, configured to demodulate and process the MBSFN subframe received by the second receiving module in a processing mode corresponding to the determined purpose of the MBSFN subframe.

It can be known from the foregoing technical solutions that, the technical solutions according to the embodiments of the present invention have the following advantages: The access network equipment notifies a purpose of an MBSFN subframe included by a radio frame to the UE through a broadcast message. Therefore, the UE can easily determine the purpose of the MBSFN subframe in the radio frame, and may demodulate and process the MBSFN subframe in the processing mode corresponding to the purpose of the MBSFN subframe, which improves reliability of communication.

BRIEF DESCRIPTION OF THE DRAWINGS

To illustrate the technical solution of the present invention more clearly, the following introduces briefly the accompanying drawings to be used for describing the embodiments. Apparently, the accompanying drawings described in the following are merely some embodiments of the present invention, and for persons of ordinary skill in the art, other drawings may be obtained according to these accompanying drawings without any creative effort.

DETAILED DESCRIPTION OF THE EMBODIMENTS

An embodiment of the present invention provides a method and an equipment for notifying a purpose of a subframe, and a method and an equipment for processing a subframe. An access network equipment notifies the purpose of an MBSFN subframe in a radio frame to the UE, and then, the UE demodulates and processes the MBSFN subframe in a processing mode corresponding to the purpose of the MBSFN subframe, which improves reliability of communication.

The detailed descriptions are given respectively in the following with reference to specific embodiments.

Figure 1:
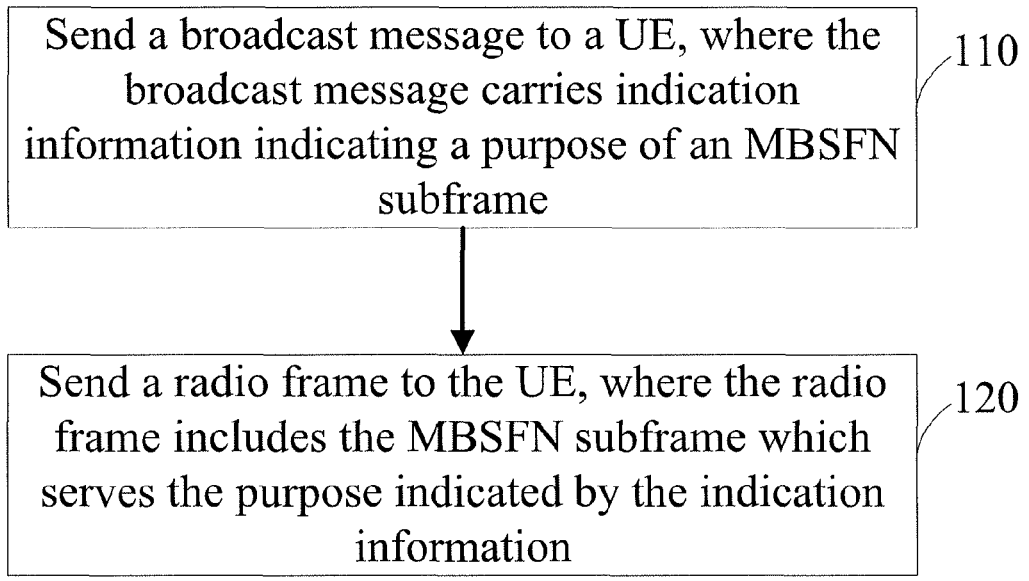
FIG. 1 is a flowchart of a method for notifying a purposes of a subframe according to embodiment 1 of the present invention.

Referring to FIG. 1, a method for notifying a purpose of a subframe according to embodiment 1 of the present invention may include:

110: Send a broadcast message to a UE, where the broadcast message carries indication information indicating a purpose of an MBSFN subframe.

In an application scenario, the foregoing indication information may be carried in an existing broadcast message and sent to the UE; or, alternatively, a dedicated broadcast message may be designed, where the foregoing indication information is carried in the dedicated broadcast message and sent to the UE.

The data format of the broadcast message and the data format of the indication information may be appointed uniformly by the sender of the broadcast message and the UE.

120: Send a radio frame to the UE, where the radio frame includes the MBSFN subframe which serves the purpose indicated by the indication information.

Specifically, a broadcast message may be sent to the UE before, while or after the radio frame that includes the MBSFN subframe is sent to the UE. The broadcast message carries indication information of the purpose of the MBSFN subframe. The purpose of the MBSFN subframe included in the radio frame is notified to the UE.

After determining, according to the broadcast message, the purpose of the MBSFN subframe included in the radio frame, the UE may demodulate and process the MBSFN subframe in the radio frame in a processing mode corresponding to the purpose of the MBSFN subframe.

It should be noted that, the foregoing steps may be implemented on an access network equipment of a communication system, and the access network equipment may be a base station, a Base Station Controller (BSC), or another equipment of similar functions in the communication system. The UE may be a mobile phone, a Personal Digital Assistant (PDA), a portable computer, or another equipment of similar communication functions, which is not limited in the present invention.

The technical solution in this embodiment is applicable to multiple communication systems, such as the Wideband Code Division Multiple Access (WCDMA) system, Time Division-Synchronous Code Division Multiple Access (TD-SCDMA) system, Long Term Evolution (LTE) system, LTE-9 system, LTE-A system, and systems upgraded from them, which are not limited here.

It can be known from the foregoing technical solution that, in this embodiment, the access network equipment notifies the purpose of the MBSFN subframe included in a radio frame to the UE through the broadcast message, so that the UE can easily determine the purpose of the MBSFN subframe in the radio frame, and may then demodulate and process the MBSFN subframe in the processing mode corresponding to the purpose of the MBSFN subframe, which relatively improves reliability of communication.

Figure 2:
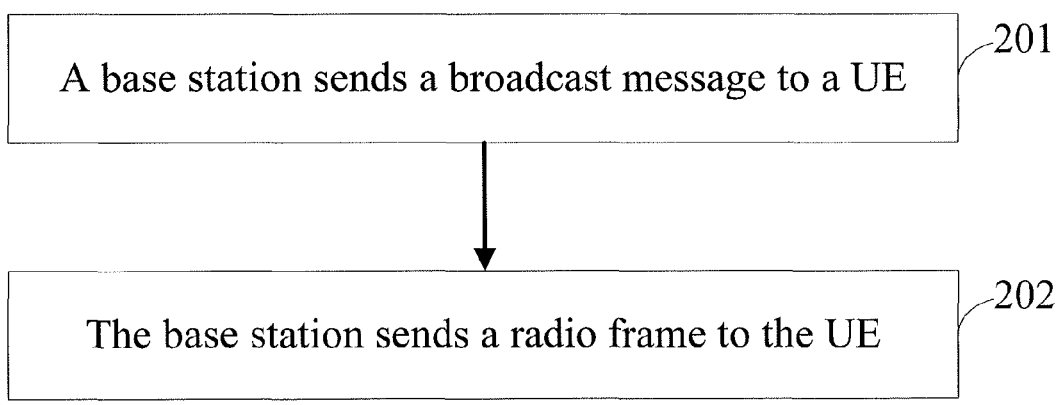
FIG. 2 is a flowchart of a method for notifying a purpose of a subframe according to embodiment 2 of the present invention.

For easy understanding, the case that a base station sends a radio frame and a broadcast message that carries indication information indicating a purpose of a MBSFN subframe to a UE is taken for example for detailed illustration in the following. Referring to FIG. 2, a method for notifying the purpose of the subframe according to embodiment 2 of the present invention may include:

201: The base station sends a broadcast message to the UE.

The broadcast message may carry the indication information indicating the purpose of the MBSFN subframe. The base station may optionally add a field to an existing broadcast message to have the indication information carried in the existing broadcast message and sent to the UE, or set a dedicated broadcast message to have the foregoing indication information carried in the dedicated broadcast message and sent to the UE.

The broadcast message comes in many types. In an application scenario, the base station may optionally add a field into a broadcast message that carries a System Information Block (SIB), and have the indication information, which indicates the purpose of the MBSFN subframe, carried in the SIB of the broadcast message and sent to the UE. The SIB may include multiple fields. Each field bears different information, and the indication information indicating the purpose of the MBSFN subframe may be located in a non-critical extension field of the SIB.

The indication information indicating the purpose of the MBSFN subframe is mainly used to notify the purpose of the MBSFN subframe included in the radio frame to the UE. The data format of the indication information may be any format appointed by the base station and the UE. In an application scenario, the indication information may include K*N indication bits (which are referred to as purpose indication bits hereinafter for distinction), where N is the number of MBSFN subframes included in one or more radio frames sent by the base station to the UE, or the number of all potential MBSFN subframes in one or more radio frames, and K is greater than or equal to a logarithm of the total number of purposes of the MBSFN subframes included in one or more radio frames to the base 2. For example, the value of K is a minimum integer greater than or equal to the logarithm of the total number of purposes of the MBSFN subframes included in one or more radio frames to the base 2.

202: The base station sends a radio frame to the UE.

The base station may send multiple radio frames to the UE continuously, where one or more of the radio frames include the MBSFN subframe which serves the purpose indicated by the indication information.

Further, if the purpose of the MBSFN subframe in the radio frame to be sent by the base station in the current period is different from the purpose of the MBSFN subframe in the radio frame sent in the previous period, the base station may send a broadcast message that carries update indication information to the UE, so that the indication information is effective in real time.

The base station may periodically send a broadcast message that carries indication information indicating the purpose of the MBSFN subframe to the UE, and/or send the broadcast message to the UE as triggered under a condition.

Figure 3:
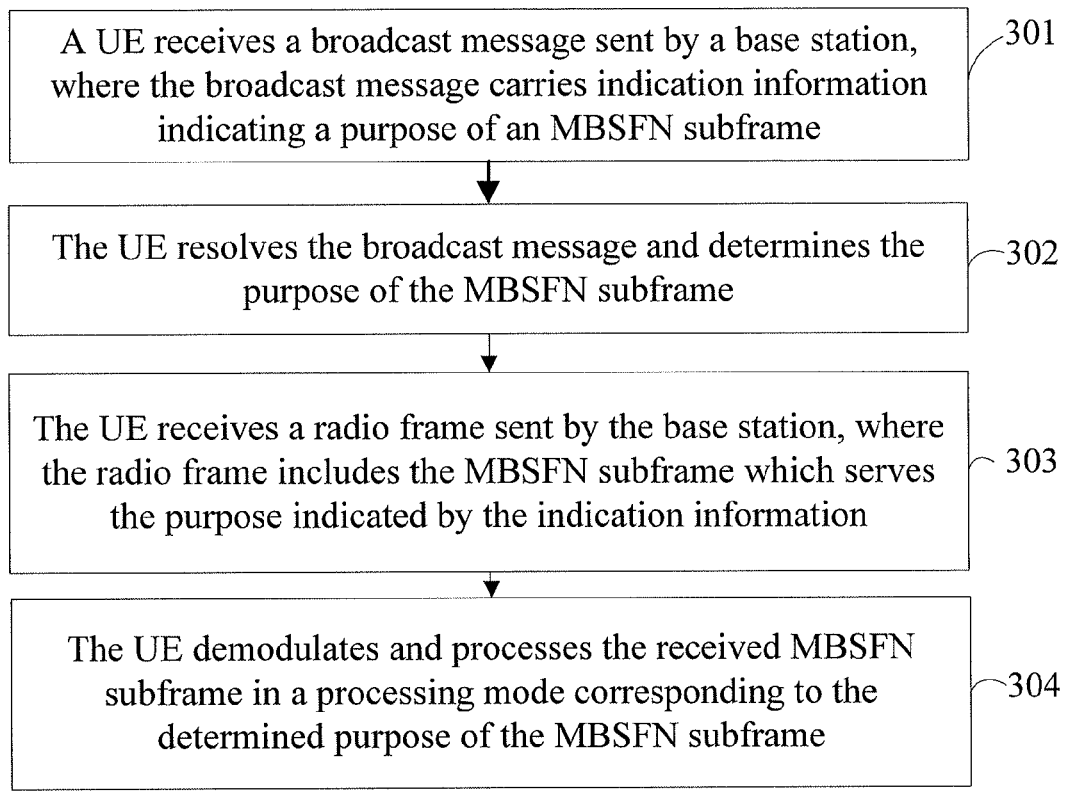
FIG. 3 is a flowchart of a method for processing a subframe according to embodiment 2 of the present invention.

The foregoing step is illustrated in the following with the UE party as a reference party. Referring to FIG. 3, a method processing a subframe according to embodiment 2 of the present invention may include:

301: A UE receives a broadcast message sent by a base station. The broadcast message carries indication information indicating a purpose of an MBSFN subframe.

302: The UE resolves the broadcast message and determine the purpose of the MBSFN subframe.

303: The UE receives a radio frame sent by the base station. The radio frame includes the MBSFN subframe which serves the purpose indicated by the indication information.

The UE may resolve the received broadcast message according to the appointed data format and then determine the purpose of the MBSFN subframe received or to be received. In an application scenario, the indication information is located in a non-critical extension field of the SIB of the broadcast message, and the UE may determine the true purpose of the MBSFN subframe by resolving the non-critical extension field of the SIB of the broadcast message.

304: The UE demodulates and processes the received MBSFN subframe in a processing mode corresponding to the determined purpose of the MBSFN subframe.

The base station may send a broadcast message that carries indication information indicating the purpose of the MBSFN subframe to the UE at regular or irregular intervals. For the UE, the latest received indication information generally prevails.

The UE may store the processing mode corresponding to the purpose of the MBSFN subframe beforehand, and demodulate and process the required relevant data. For example, pilot patterns of the MBSFN subframes that serve various purposes are stored in the UE. After determining, according to the indication information, the purpose of each MBSFN subframe included in the radio frame, the UE demodulates and processes the data over each MBSFN subframe in the corresponding processing mode, and then implements the corresponding technical functions effectively.

For better understanding of the technical solution of the present invention, the case that the technical solution is implemented in an LTE-A system is used for a more detailed introduction in the following.

It is stipulated in the 3GPP LTE protocol that, a radio frame may include 10 subframes, where the 10 subframes of the radio frame may include a non-MBSFN subframe and an MBSFN subframe. The first 1 to 2 OFDM symbols of the MBSFN subframe are generally used for bearing the unicast control signaling. The number of OFDM symbols (such as 1 or 2 OFDM symbols) may be notified by the base station to the UE through a Physical Control Format Indicator Channel (PCFICH).

The pilot pattern generally differs between an MBSFN subframe and a non-MBSFN subframe, and may also differ between MBSFN subframes that serve different purposes. First, the UE needs to differentiate which subframe is an MBSFN subframe and which is a non-MBSFN subframe among multiple subframes in a radio frame.

The LTE protocol defines a SIB, and the base station may have a broadcast message carried in the SIB and sent to the UE. The SIB may include multiple fields, for example, an MBSFN-subframe configuration field, and a non-critical extension field.

The base station may have the configuration information of the MBSFN subframe carried in the MBSFN-subframe configuration field in the SIB, and then notify the layout of the MBSFN subframe in the radio frame to the UE.

The MBSFN subframe configuration field includes three parts: radio frame allocation period field, radio frame allocation offset field, and subframe allocation field.

The values of the radio frame allocation period field include: 1, 2, 4, 8, 16, or 32, measured in radio frames. For example, if the value of the radio frame allocation period field is 1, it indicates that every radio frame sent by the base station includes an MBSFN subframe; if the value of the radio frame allocation period field is 2, it indicates that the base station sends alternately a radio frame including an MBSFN subframe and a radio frame not including an MBSFN subframe, and so on.

The values of the radio frame allocation offset field are generally 0 to 7, measured in radio frames. For example, if the value of the radio frame allocation offset field is 0, it indicates that the first radio frame sent by the base station includes an MBSFN subframe; and if the value of the radio frame allocation offset field is 6, it indicates that from the sixth radio frame on, the base station sends radio frames including an MBSFN subframe, and so on.

The subframe allocation field may be in one of two formats: 6 indication bits (hereinafter referred to as subframe indication bits for distinction) is set corresponding to one radio frame; in the case of Frequency Division Duplex (FDD), the 6 bits correspond to subframe 1, subframe 2, subframe 3, subframe 6, subframe 7, and subframe 8 in a radio frame respectively; in the case of Time Division Duplex (TDD), the first 5 bits correspond to subframe 3, subframe 4, subframe 7, subframe 8, and subframe 9 in a radio frame respectively, and the sixth bit is idle. The other format is: 24 subframe indication bits are set corresponding to 4 radio frames; in the case of FDD, every 6 bits correspond to subframe 1, subframe 2, subframe 3, subframe 6, subframe 7, and subframe 8 in each radio frame respectively; in the case of TDD, every 5 bits correspond to subframe 3, subframe 4, subframe 7, subframe 8, and subframe 9 in each radio frame respectively, and the last 4 bits are idle. For example, if the value of the subframe indication bit of the subframe allocation field corresponding to subframe 3 in a radio frame is 1, it indicates that subframe 3 is an MBSFN subframe; if the value of the indication bit corresponding to subframe 3 is 0, it indicates that subframe 3 is a non-MBSFN subframe, and so on.

According to the information carried in the MBSFN subframe configuration field of the SIB, the UE may determine which subframe is an MBSFN subframe and which is a non-MBSFN subframe among all subframes of one or more radio frames, namely, determine layout of the MBSFN subframe in the radio frame.

With evolution of technologies, new technologies are phased in. For example, new technologies adopted in a 3GPP LTE-A system may be: Relay, High Order Multi-Input Multi-Output (HO-MIMO) technology, Coordinated Multi-Point (COMP) transmission, using FDD downlink carriers to bear Sounding Reference Signal (SRS), and position technology.

The UE of LTE R8 generally does not process an MBSFN subframe (except the first 1 to 2 OFDM symbols). After the foregoing new technologies are adopted, based on the consideration of backward compatibility, the data required for implementing the foregoing new technologies between the LTE-A base station and the UE may be carried over the MBSFN subframe. Specifically, the UEs in an LTE R9 system, an LTE-A system, and systems upgraded from them may identify the data borne by the MBSFN subframe, but an LTE R8 user does not identify the data borne by the MBSFN subframe. Using the MBSFN subframe to bear the data required for implementing the foregoing new technologies may ensure that a higher-version system is backward-compatible with UEs in lower-version systems.

However, for a user in an LTE R9 system, an LTE-A system or systems upgraded from them, it is necessary to further identify the true purpose of the MBSFN subframe (except the first 1-2 OFDM symbols), in order to correctly demodulate and process the data borne by the MBSFN subframe and then effectively communicate with an LTE R9 base station, an LTE-A base station, or a base station in a system upgraded from them.

In an application scenario, a system uses M types of new technologies, and a base station can use M subframes of MBSFN to bear respectively the data required for implementing the M types of new technologies. The base station may use K purpose indication bits to indicate that the data carried in an MBSFN subframe is the data required for implementing which type of new technology. That is, the base station may use K purpose indication bits to indicate the true purpose of one MBSFN subframe, where K may be a random integer greater than or equal to a logarithm of M to the base 2.

That is, $K >= \log_2 M$.

In the following, the case that the value of K is a minimum integer greater than or equal to a logarithm of M to the base 2 is taken for example for detailed illustration. For example, in an application scenario, if the purposes of the MBSFN subframes sent by the base station include: bearing the data required for implementing 6 techniques such as Relay, HO-MIMO, POSITION, MBSFN, CoMP, and SRS borne on the downlink carrier, and, if the terminal needs to differentiate the foregoing 6 purposes, then K=3. A mapping relationship between the values of the K purpose indication bits indicating the purposes of the MBSFN subframes and the purposes of the MBSFN subframes may be as shown in, but is not limited to Table 1:

TABLE 1

| Value of K indication bits (binary) | Purpose of MBSFN subframes |
|---|---|
| 000 | MBSFN |
| 001 | Relay |
| 010 | CoMP |
| 011 | HO-MIMO |
| 100 | POSITION |
| 101 | SRS borne on the downlink carrier |
| 110 | Reserved |
| 111 | Reserved |

As shown in Table 1, if the value of the K purpose indication bits indicating a purpose of an MBSFN subframe is 000, it indicates that the purpose of the MBSFN subframe is implementing MBSFN transmission; if the value of the K purpose indication bits for indicating a purpose of an MBSFN subframe is 001, it indicates that the purpose of the MBSFN subframe is bearing data required for implementing the relay technology, and so on.

In another scenario, if the purposes of MBSFN subframes sent by the base station include only 4 of the following purposes: bearing the data required for implementing HO-MIMO, Relay, POSITION, MBSFN, CoMP, and SRS borne on the downlink carrier, and, if the UE needs to differentiate only 4 of the foregoing purposes, then K=2. Mapping relationships between the values of the K purpose indication bits for indicating the purposes of the MBSFN subframes and the purposes of the MBSFN subframes may be as shown in, but are not limited to Table 2 to Table 7:

TABLE 2

| Value of K indication bits (binary) | Purpose of MBSFN subframes |
|---|---|
| 00 | MBSFN |
| 01 | Relay |
| 10 | CoMP |
| 11 | HO-MIMO |

TABLE 3

| Value of K indication bits (binary) | Purpose of MBSFN subframes |
|---|---|
| 00 | MBSFN |
| 01 | Relay |
| 10 | CoMP |
| 11 | Position |

TABLE 4

| Value of K indication bits (binary) | Purpose of MBSFN subframes |
|---|---|
| 00 | MBSFN |
| 01 | Relay |
| 10 | CoMP |
| 11 | SRS borne on the downlink carrier |

TABLE 5

| Value of K indication bits (binary) | Purpose of MBSFN subframes |
|---|---|
| 00 | MBSFN |
| 01 | Relay |
| 10 | HO-MIMO |
| 11 | SRS borne on the downlink carrier |

TABLE 6

| Value of K indication bits (binary) | Purpose of MBSFN subframes |
|---|---|
| 00 | MBSFN |
| 01 | Relay |
| 10 | Position |
| 11 | SRS borne on the downlink carrier |

TABLE 7

| Value of K indication bits (binary) | Purpose of MBSFN subframes |
|---|---|
| 00 | MBSFN |
| 01 | Relay |
| 10 | Position |
| 11 | HO-MIMO |

As shown in Table 2 to Table 7, the base station may maintain the MBSFN subframe to fulfill the purpose of MBSFN transmission and the purpose of implementing the relay technique, and other purposes of the MBSFN subframe are optional.

In another scenario, if the purposes of MBSFN subframes sent by the base station include only 2 of the following purposes: bearing the data required for implementing HO-MIMO, Relay, POSITION, MBSFN, CoMP, and SRS borne on the downlink carrier, and, if the UE needs to differentiate only 2 of the foregoing purposes, then K=1. Mapping relationships between the values of the K purpose indication bits indicating the purposes of the MBSFN subframes and the purposes of the MBSFN subframes may be as shown in, but are not limited to Table 8 to Table 12:

TABLE 8

| Value of K indication bits (binary) | Purpose of MBSFN subframes |
| --- | --- |
| 0 | MBSFN |
| 1 | Relay |

TABLE 9

| Value of K indication bits (binary) | Purpose of MBSFN subframes |
| --- | --- |
| 0 | MBSFN |
| 1 | HO-MIMO |

TABLE 10

| Value of K indication bits (binary) | Purpose of MBSFN subframes |
| --- | --- |
| 0 | MBSFN |
| 1 | CoMP |

TABLE 11

| Value of K indication bits (binary) | Purpose of MBSFN subframes |
| --- | --- |
| 0 | MBSFN |
| 1 | Position |

TABLE 12

| Value of K indication bits (binary) | Purpose of MBSFN subframes |
| --- | --- |
| 0 | MBSFN |
| 1 | SRS borne on the downlink carrier |

As shown in Table 8 to Table 12, the base station may maintain the MBSFN subframe to fulfill the purpose of MBSFN transmission, and other purposes of the MBSFN subframe are optional.

Table 1 to Table 12 above may be referred to as MBSFN subframe purpose indication tables. The base station and the UE may respectively store one of such tables, where the table corresponds to MBSFN subframes that serve various purposes and are sent by the base station.

In the following, the case that the subframe allocation field of the MBSFN subframe configuration field of the SIB is 6 subframe indication bits is taken for example to illustrate how a base station indicate the true purpose of an MBSFN subframe to a UE.

If N of the 6 bits of subframe indication of the subframe allocation field of the MBSFN subframe configuration field are 1s, it indicates that a radio frame includes N MBSFN subframes, and the UE needs to determine true purposes of the N MBSFN subframes. The base station may use K bits to indicate the purpose of an MBSFN subframe. Therefore, K*N purpose indication bits may be used to indicate purposes of N subframes of MBSFN.

Alternatively, N may be the number of all potential MBSFN subframes in one or more radio frames, for example, N=6.

The base station may have the K*N purpose indication bits, which indicates purposes of N MBSFN subframes, carried in a non-critical extension field of a SIB. A UE of LTE R8 does not read information carried in the non-critical extension field, but UEs of LTE R9, LTE-A, and higher versions read information carried in the non-critical extension field. Therefore, backward compatibility with UEs of lower versions such as LTE R8 is ensured.

Figure 4:
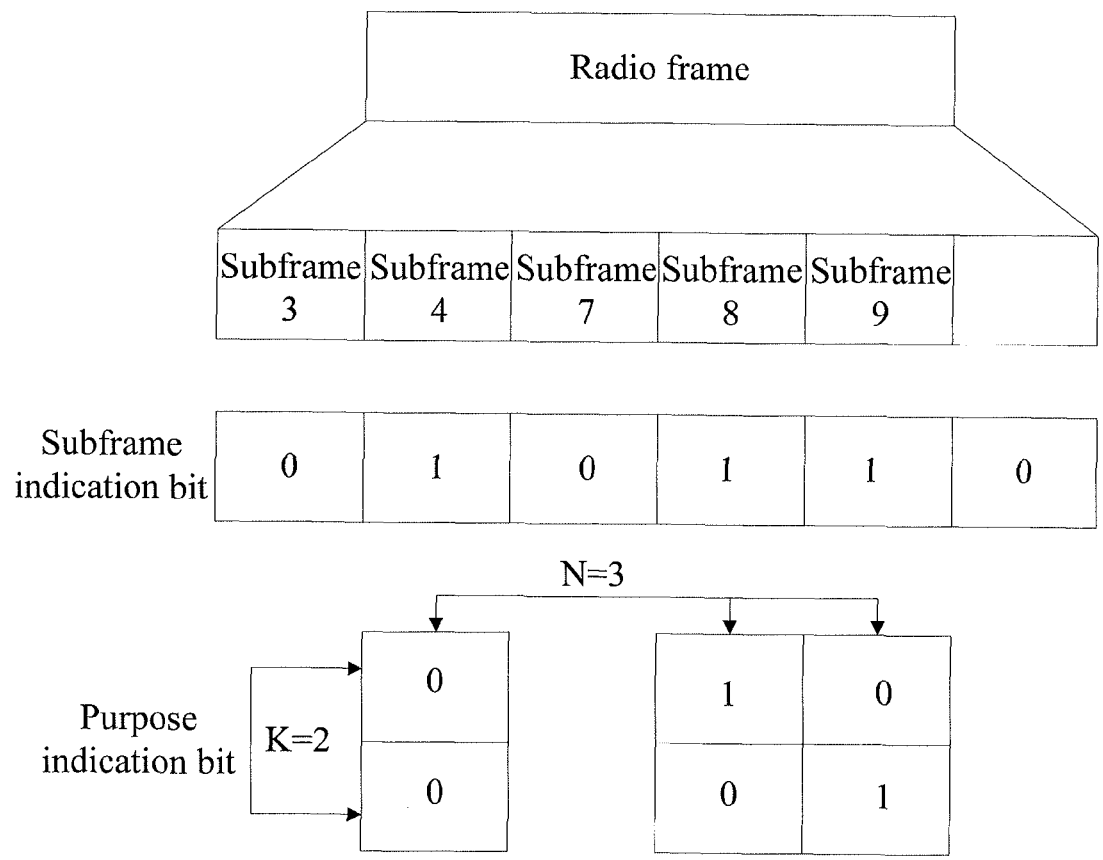
FIG. 4 is a schematic diagram of a mapping relationship between an MBSFN subframe and an indication bit according to embodiment 2 of the present invention.

Referring to FIG. 4, FIG. 4 corresponds to a scenario where a subframe allocation field of an MBSFN subframe configuration field includes 6 subframe indication bits. Take the case of TDD for example: subframe 3, subframe 4, subframe 7, subframe 8, and subframe 9 in a radio frame are possibly MBSFN subframes. For example, if the values of the 6 subframe indication bits of the subframe allocation field are 010110 (the value of the last bit is invalid), it indicates that subframe 4, subframe 8, and subframe 9 are MBSFN subframes. If the values of the K*N purpose indication bits indicating purposes of the MBSFN subframes in the non-critical extension field of the SIB are 001001, and the MBSFN subframe purpose indication table stored in the UE is Table 2, then the UE may resolve the MBSFN subframe configuration field and the non-critical extension field of the SIB after receiving the broadcast message that carries the SIB and is sent by the base station, and determine that subframe 4, subframe 8, and subframe 9 in the radio frame are MBSFN subframes. The values of the K purpose indication bits corresponding to subframe 4 are 00; the values of the K purpose indication bits corresponding to subframe 8 are 10; and the values of the K purpose indication bits corresponding to subframe 9 are 01. Through lookup in Table 2, it is determined that the purpose of subframe 4 is implementing MBSFN transmission, the purpose of subframe 8 is bearing the data required for implementing CoMP, and the purpose of subframe 9 is bearing the data required for implementing relay. After receiving the radio frame sent by the base station, the UE may demodulate and process the MBSFN subframe in a processing mode corresponding to the purpose of each MBSFN subframe. The procedure in the case of FDD can be inferred according to the foregoing description, which is not detailed here.

Figure 5:
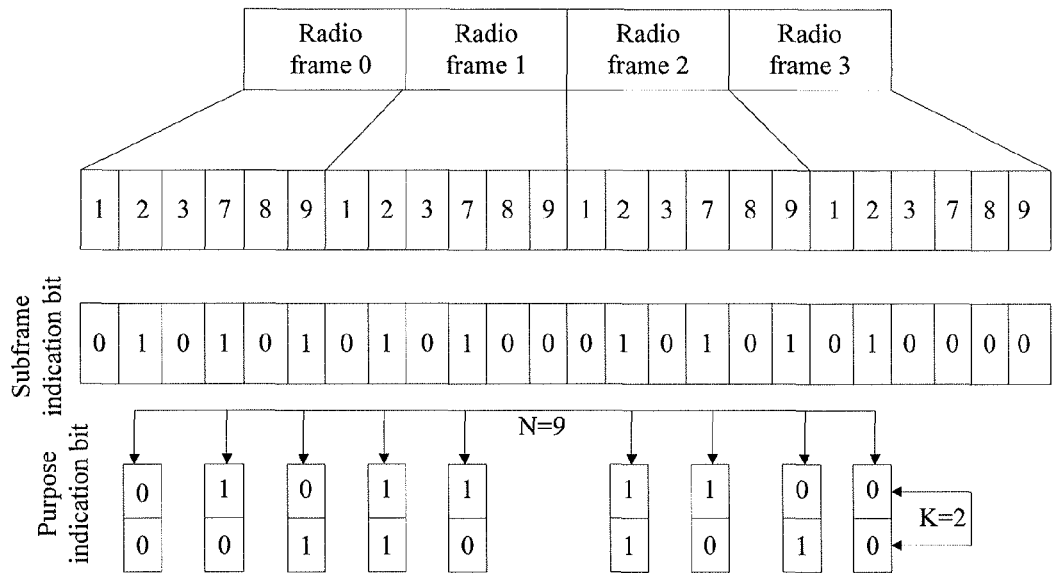
FIG. 5 is a schematic diagram of another mapping relationship between an MBSFN subframe and an indication bit according to embodiment 2 of the present invention.

Referring to FIG. 5, FIG. 5 corresponds to a scenario where a subframe allocation field of the MBSFN subframe configuration field includes 24 subframe indication bits. Take the case of FDD for example: subframe 2, subframe 3, subframe 4, subframe 7, subframe 8, and subframe 9 in a radio frame are possibly MBSFN subframes. For example, if the values of the 24 subframe indication bits of the subframe allocation field are 010101010100010101010000, it indicates that: among 4 neighboring radio frames including an MBSFN subframe, subframe 2, subframe 7, and subframe 9 of radio frame 0 are MBSFN subframes, subframe 2 and subframe 7 of radio frame 1 are MBSFN subframes, subframe 2, subframe 7, and subframe 9 of radio frame 2 are MBSFN subframes, and subframe 2 of radio frame 3 is an MBSFN subframe.

If the values of the K*N purpose indication bits indicating purposes of the MBSFN subframes in the non-critical extension field of the SIB are 001001111011100100, and the MBSFN subframe purpose indication table stored by the UE is Table 3, then the UE may resolve the MBSFN subframe configuration field and the non-critical extension field of the SIB after receiving the broadcast message that carries the SIB and is sent by the base station, and determine which subframe in the radio frame is an MBSFN subframe.

For example, the UE performs the resolution and finds that the values of the K purpose indication bits corresponding to subframe 2 of radio frame 0 are 00, and determines, through lookup in Table 3, that the purpose of the subframe is implementing MBSFN transmission; and the UE finds that the values of the K purpose indication bits corresponding to subframe 7 of radio frame 2 are 10, and determines, through lookup in Table 3, that the purpose of the subframe is bearing the data required for implementing CoMP, and so on. After receiving the radio frame sent by the base station, the UE may demodulate and process the MBSFN subframe in a processing mode corresponding to the purpose of each MBSFN subframe. The procedure in the case of TDD can be inferred according to the foregoing description, which is not detailed here.

It should be noted that, the foregoing implementation mode of the LTE-A system is merely taken for example. Definitely, other technical means of the same or similar technical effects may also be adopted in place of the foregoing example partly or completely. During implementation in other systems, the implementation mode may vary.

It can be known from the foregoing technical solution that, in this embodiment, the base station notifies the purpose of the MBSFN subframe in a radio frame to the UE through a broadcast message. Therefore, the UE can easily determine the purpose of the MBSFN subframe included in the radio frame, and then may demodulate and process the MBSFN subframe in the processing mode corresponding to the purpose of the MBSFN subframe, which relatively improves reliability of communication.

Further, the base station uses a non critical extension field of the SIB to carry the indication information indicating the purpose of the MBSFN subframe, which ensures backward compatibility with lower versions of UEs.

Embodiment 3

Figure 6:
FIG. 6 is a schematic structural diagram of an access network equipment according to embodiment 3 of the present invention.

Accordingly, this embodiment provides an access network equipment. Referring to FIG. 6, the access network equipment in the third embodiment may include:

a first sending module 610, configured to send a broadcast message to a UE, where the broadcast message carries indication information indicating a purpose of an MBSFN subframe, where the first sending module 610 may have the foregoing indication information carried in an existing broadcast message and sent to the UE, or, design a dedicated broadcast message to have the foregoing indication information carried in the dedicated broadcast message and sent to the UE; and a second sending module 620, configured to send a radio frame to the UE, where the radio frame carries the MBSFN subframe which serves the purpose indicated by the indication information.

Specifically, before, when or after the second sending module 620 sends the radio frame including the MBSFN subframe to the UE, the first sending module 610 may send the broadcast message to the UE, where the broadcast message carries indication information indicating the purpose of the MBSFN subframe, and notify the purpose of the MBSFN included in the radio frame to the UE.

After determining, according to the broadcast message, the purpose of the MBSFN subframe included in the radio frame, the UE may demodulate and process the MBSFN subframe in the radio frame in a processing mode corresponding to the purpose of the MBSFN subframe.

In an application scenario, the first sending module 610 may be specifically configured to send a broadcast message that carries a SIB to the UE, where the indication information indicating the purpose of the MBSFN subframe is located in the SIB.

In an application scenario, the first sending module 610 is specifically configured to send a broadcast message that carries a SIB to the UE, where the indication information indicating the purpose of the MBSFN subframe is located in a non-critical extension field of the SIB.

The data format of the broadcast message and the data format of the indication information may be appointed uniformly by the access network equipment and the UE. In an application scenario, the indication information may include K*N purpose indication bits, in which N may be the number of MBSFN subframes included in one or more radio frames sent by the base station to the UE, or the number of all potential MBSFN subframes in one or more radio frames, and K is greater than or equal to a logarithm of the total number of purposes of the MBSFN subframes included in one or more radio frames to the base 2. For example, the value of K is a minimum integer greater than or equal to the logarithm of the total number of purposes of the MBSFN subframes included in one or more radio frames to the base 2.

It should be noted that the foregoing access network equipment may be a base station, a BSC, or another equipment of similar functions in the communication system, which is not limited here.

It can be understood that, the access network equipment in this embodiment may be the base station described in the second embodiment. The functional modules of the access network equipment may work in the way described in the method in the second embodiment. For details about the method for implementing the functions of such modules, reference may be made to the relevant description in the second embodiment, and the details thereof are not described here.

It can be known from the foregoing technical solution that, in this embodiment, the access network equipment notifies the purpose of the MBSFN subframe in a radio frame to the UE through a broadcast message. Therefore, the UE can determine the purpose of the MBSFN subframe in the radio frame easily, and may demodulate and process the MBSFN subframe in the processing mode corresponding to the purpose of the MBSFN subframe, which relatively improves reliability of communication.

Embodiment 4

Figure 7:
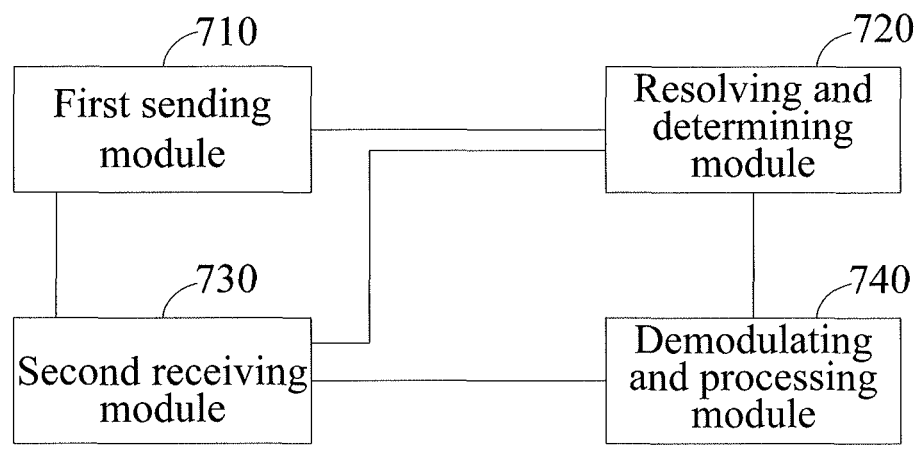
FIG. 7 is a schematic structural diagram of a UE according to embodiment 4 of the present invention.

Accordingly, this embodiment further provides a UE. Referring to FIG. 7, the UE in embodiment 4 may include:

a first receiving module 710, configured to receive a broadcast message, where the broadcast message carries indication information indicating a purpose of an MBSFN subframe;

a resolving and determining module 720, configured to resolve the broadcast message received by the first receiving module 710, and determine the purpose of the MBSFN subframe; and a second receiving module 730, configured to receive a radio frame that carries the MBSFN subframe which serves the purpose indicated by the indication information.

The resolving and determining module 720 may resolve, according to the appointed data format, the broadcast message received by the first receiving module 710, and then determine the true purpose of the MBSFN subframe received or to be received by the second receiving module 720. In an application scenario, the indication information is located in a non-critical extension field of the SIB of the broadcast message, and the resolving and determining module 720 may determine the true purpose of the MBSFN subframe by resolving the non-critical extension field of the SIB of the broadcast message.

The UE may further include a demodulating and processing module 740, which is configured to demodulate and process the MBSFN subframe received by the second receiving module 730 in a processing mode corresponding to the purpose of the MBSFN subframe where the purpose is determined by the resolving and determining module 720.

The UE may store the processing mode corresponding to the purpose of the MBSFN subframe beforehand, and demodulate and process the required relevant data. For example, pilot patterns of the MBSFN subframes that serve various purposes is stored and demodulated by the UE. After the resolving and determining module 720 determines, according to the indication information, the purpose of the MBSFN subframe included in the radio frame, the demodulating and processing module 740 demodulates and processes the data borne by each MBSFN subframe in the corresponding mode, and implements the corresponding technical functions effectively.

In an application scenario, the indication information is located in a non-critical extension field of the SIB carried in the broadcast message received by the first receiving module 710.

The resolving and determining module 720 may be specifically configured to resolve the non-critical extension field of the SIB carried in the broadcast message received by the first receiving module 710, and determine the purpose of the MBSFN subframe.

It should be noted that the UE may be a mobile phone, a PDA, a portable computer, or another equipment of similar communication functions, which is not limited here.

It can be understood that, the UE described in this embodiment may be like the UE described in embodiment 2. The functions of the functional modules of the UE may be implemented according to the method described in embodiment 2. For the specific implementation process, reference may be made to the relevant description in embodiment 2 and it is not detailed here.

It can be known from the foregoing technical solution that, in this embodiment, the UE determines the purpose of the MBSFN subframe included in the radio frame by receiving the broadcast message, and then demodulates and processes the MBSFN subframe in the processing mode corresponding to the purpose of the MBSFN subframe, which relatively improves reliability of communication.

Accordingly, an embodiment of the present invention further provides a communication system, which may include the access network equipment described in embodiment 3.

It should be noted that, for ease of description in the method embodiments above, the method is described as a combination of a series of actions. However, those skilled in the art should know that the present invention are not limited to the described action order, because some of the steps may be in other orders or occur simultaneously. Furthermore, those skilled in the art also should know that the embodiments described herein are exemplary embodiments, and the involved actions and modules are not absolutely necessary for the present invention.

In the foregoing embodiments, description of each embodiment has a different emphasis, and for the part not detailed in one embodiment, reference may be made to relevant description in another embodiment.

In conclusion, in the technical solutions of the present invention, the access network equipment notifies the purpose of the MBSFN subframe in a radio frame to the UE through a broadcast message. Therefore, the UE can determine the purpose of the MBSFN subframe in the radio frame easily, and may demodulate and process the MBSFN subframe in the processing mode corresponding to the purpose of the MBSFN subframe, which relatively improves reliability of communication.

The access network equipment uses a non-critical extension field of the SIB to carry the indication information indicating the MBSFN subframe, which ensures backward compatibility with lower versions of UEs.

Persons of ordinary skill in the art can understand that all or part of the steps of the method in the embodiments of the present invention may be implemented by a program instructing relevant hardware. The program may be stored in a computer readable storage medium. The storage media may include a Read-Only Memory (ROM), a Random Access Memory (RAM), a magnetic disk, or an optical disk.

A method and an equipment for notifying a purpose of a subframe, and a method and an equipment for processing a subframe provided in the embodiments of the present invention are introduced in detailed above. Specific examples are used in this document to describe the principle and implementation of the present invention, and the foregoing illustrations of the embodiments are merely used to facilitate the understanding of the method and core idea of the present invention. Meanwhile, those skilled in the art can make modifications and variations to the invention according to the idea of the present invention. In conclusion, the content of this specification shall not be construed as a limit of the present invention.

What is claimed is:

1. A method for notifying a purpose of a subframe, comprising:

sending a broadcast message to a user equipment (UE), wherein the broadcast message carries a first indication and a second indication, wherein the first indication includes an M bits sequence, a position of each bit in the M bits sequence corresponds to a position of one corresponding subframe in M subframes to be sent, each bit in the M bits sequence indicates whether the corresponding subframe is a Multicast Broadcast Single Frequency Network (MBSFN) subframe or a non-MBSFN subframe, and N subframe(s) of the M subframes are MBSFN subframes, and the second indication includes a K*N bits sequence, a position of each K bit(s) in the K*N bits sequence correspond(s) to a position of one corresponding MBSFN subframe of the N MBSFN subframe(s), each K bit(s) of the K*N bits sequence indicate(s) a purpose of the corresponding MBSFN, M is a natural number equal or greater than 2, and N and K are each a natural number; and after sending the broadcast message, sending a the M subframes to the UE.

2. The method according to claim 1, wherein the sending the broadcast message to the UE specifically comprises:
sending the broadcast message that carries a System Information Block (SIB) to the UE, wherein the first indication and the second indication are located in the SIB.

3. The method according to claim 2, wherein the first indication and the second indication are located in a non-critical extension field of the SIB.

4. The method according to claim 1, wherein the purpose of the one MBSFN subframe comprises:
bearing data for implementing any one of: High Order Multiple Input Multiple Output (HO-MIMO), Relay, POSITION, MBSFN, Coordinated Multipoint Transmission and Reception (CoMP) and (Sounding Reference Symbol) SRS borne on a downlink carrier.

5. A subframe processing method, comprising:
receiving a broadcast message, wherein the broadcast message carries a first indication and a second indication, wherein the first indication includes an M bits sequence, a position of each bit in the M bits sequence corresponds to a position of one corresponding subframe in M subframes to be sent, each bit in the M bits sequence indicates whether the corresponding subframe is a Multicast Broadcast Single Frequency Network (MBSFN) subframe or a non-MBSFN subframe, and N subframe(s) of the M subframes are MBSFN subframes, and the second indication includes a K*N bits sequence, a position of each K bit(s) in the K*N bits sequence correspond(s) to a position of one corresponding MBSFN subframe of the N MBSFN subframe(s), each K bit(s) of the K*N bits sequence indicate(s) a purpose of the corresponding MBSFN, M is a natural number equal or greater than 2, and N and K are each a natural number;
receiving the M subframes;
determining a purpose of a first MBSFN subframe of the received N MBSFN subframe(s) according to the first indication and second indication; and
demodulating and processing the received first MBSFN subframe in a processing mode corresponding to the determined purpose of the first MBSFN subframe.

6. The method according to claim 5, wherein the first indication and second indication are located in a non-critical extension field of a System Information Block (SIB).

7. The method according to claim 5, wherein the purpose of the one MBSFN subframe comprises:
bearing data for implementing any one of: High Order Multiple Input Multiple Output (HO-MIMO), Relay, POSITION, MBSFN, Coordinated Multipoint Transmission and Reception (CoMP) and (Sounding Reference Symbol) SRS borne on a downlink carrier.

8. An access network equipment, comprising:
a transmitter, configured to send a broadcast message to a user equipment (UE), wherein the broadcast message carries a first indication and a second indication, wherein the first indication includes an M bits sequence, a position of each bit in the M bits sequence corresponds to a position of one corresponding subframe in M subframes to be sent, each bit in the M bits sequence indicates whether the corresponding subframe is a Multicast Broadcast Single Frequency Network (MBSFN) subframe or a non-MBSFN subframe, and N subframe(s) of the M subframes are MBSFN subframes, and the second indication includes a K*N bits sequence, a position of each K bit(s) in the K*N bits sequence correspond(s) to a position of one corresponding MBSFN subframe of the N MBSFN subframe(s), each K bit(s) of the K*N bits sequence indicate(s) a purpose of the corresponding MBSFN, M is a natural number equal or greater than 2, and N and K are each a natural number; and
wherein the transmitter is further configured to send the M subframes to the UE after sending the broadcast message.

9. The access network equipment according to claim 8, wherein:
the transmitter is specifically configured to send the broadcast message that carries a System Information Block (SIB) to the UE, wherein the first indication and the second indication are located in the SIB.

10. The access network equipment according to claim 9, wherein
the first indication and the second indication are located in a non-critical extension field of the SIB.

11. The access network equipment according to claim 8, wherein the purpose of the one MBSFN subframe comprises:
bearing data for implementing any one of: High Order Multiple Input Multiple Output (HO-MIMO), Relay, POSITION, MBSFN, Coordinated Multipoint Transmission and Reception (CoMP) and (Sounding Reference Symbol) SRS borne on a downlink carrier.

12. A user equipment (UE), comprising:
a receiver, configured to receive a broadcast message, wherein the broadcast message carries a first indication and a second indication, wherein the first indication includes an M bits sequence, a position of each bit in the M bits sequence corresponds to a position of one corresponding subframe in M subframes to be sent, each bit in the M bits sequence indicates whether the corresponding subframe is a Multicast Broadcast Single Frequency Network (MBSFN) subframe or a non-MBSFN subframe, and N subframe(s) of the M subframes are MBSFN subframes, and the second indication includes a K*N bits sequence, a position of each K bit(s) in the K*N bits sequence correspond(s) to a position of one corresponding MBSFN subframe of the N MBSFN subframe(s), each K bit(s) of the K*N bits sequence indicate(s) a purpose of the corresponding MBSFN, M is a natural number equal or greater than 2, and N and K are each a natural number;
wherein the receiver, is further configured to receive the M subframes; and
a processor, configured to determine a purpose of a first MBSFN subframe of the received N MBSFN subframe(s) according to the first indication and the second indication;
wherein the processor is further configured to demodulate and process the received first MBSFN subframe in a processing mode corresponding to the determined purpose of the first MBSFN subframe.

13. The UE according to claim 12, wherein:
the first indication and second indication are located in a non-critical extension field of a System Information Block (SIB) received by the receiver.

14. The UE according to claim 12, wherein the purpose of the one MBSFN subframe comprises:
bearing data for implementing any one of: High Order Multiple Input Multiple Output (HO-MIMO), Relay, POSITION, MBSFN, Coordinated Multipoint Transmission and Reception (CoMP) and (Sounding Reference Symbol) SRS borne on a downlink carrier.

* * * * *

UNITED STATES PATENT AND TRADEMARK OFFICE
CERTIFICATE OF CORRECTION

PATENT NO.         : 8,605,706 B2
APPLICATION NO.    : 13/278829
DATED              : December 10, 2013
INVENTOR(S)        : Yongxia Lv Page 1 of 1

It is certified that error appears in the above-identified patent and that said Letters Patent is hereby corrected as shown below:

In the Claims:
In Col. 14, line 66, claim 1, delete "sending a" and insert --sending--.
In Col. 16, line 44, claim 12, delete "receiver," and insert --receiver--.

Signed and Sealed this
Twenty-fifth Day of March, 2014

Michelle K. Lee
*Deputy Director of the United States Patent and Trademark Office*